United States Patent [19]
Schmidt

[11] 3,841,462
[45] Oct. 15, 1974

[54] LENGTH MEASURER FOR ELONGATE MATERIALS

[76] Inventor: Hans V. Schmidt, 5218 Fairlawn Ave., Baltimore, Md. 21215

[22] Filed: June 22, 1973

[21] Appl. No.: 372,856

[52] U.S. Cl. ................ 198/39, 83/522, 214/1 MD
[51] Int. Cl. ............................................ B65g 69/00
[58] Field of Search .......... 198/19, 39, 40; 214/1 F, 214/1 S, 1 PE, 1 MD, 1 CM; 83/520, 522

[56] References Cited
UNITED STATES PATENTS

| | | | |
|---|---|---|---|
| 2,956,666 | 10/1960 | Krynytzky | 198/40 |
| 3,454,169 | 7/1969 | Bridges | 214/1 CM |

*Primary Examiner*—Evon C. Blunk
*Assistant Examiner*—Joseph E. Valenza
*Attorney, Agent, or Firm*—John F. McClellan, Sr.

[57] ABSTRACT

A powered length-setting device for use in structural beam cut-off sawing and the like, employing carriage-mounted resilient support and guidance wheels, direct acting internal expanding brake system, self-adjusting pendulum coupling of a resilient drive wheel, and closed-circuit television for observation of a scale on a fixed linear tape, permitting the use of a relatively primitive hot-rolled unmachined H-beam and an angle unit as a precision way by averaging-out irregularities; novel beam-contact assurance circuitry, shipping/field-assembly structure, and work ejector structure are also disclosed.

16 Claims, 12 Drawing Figures

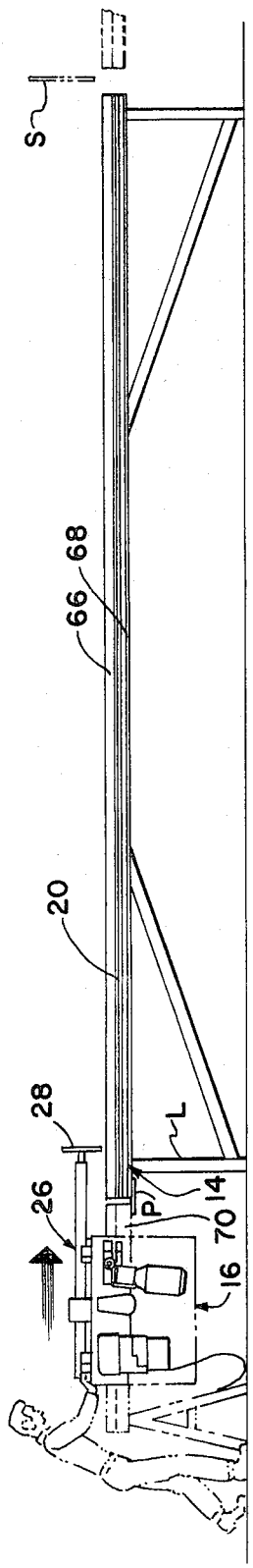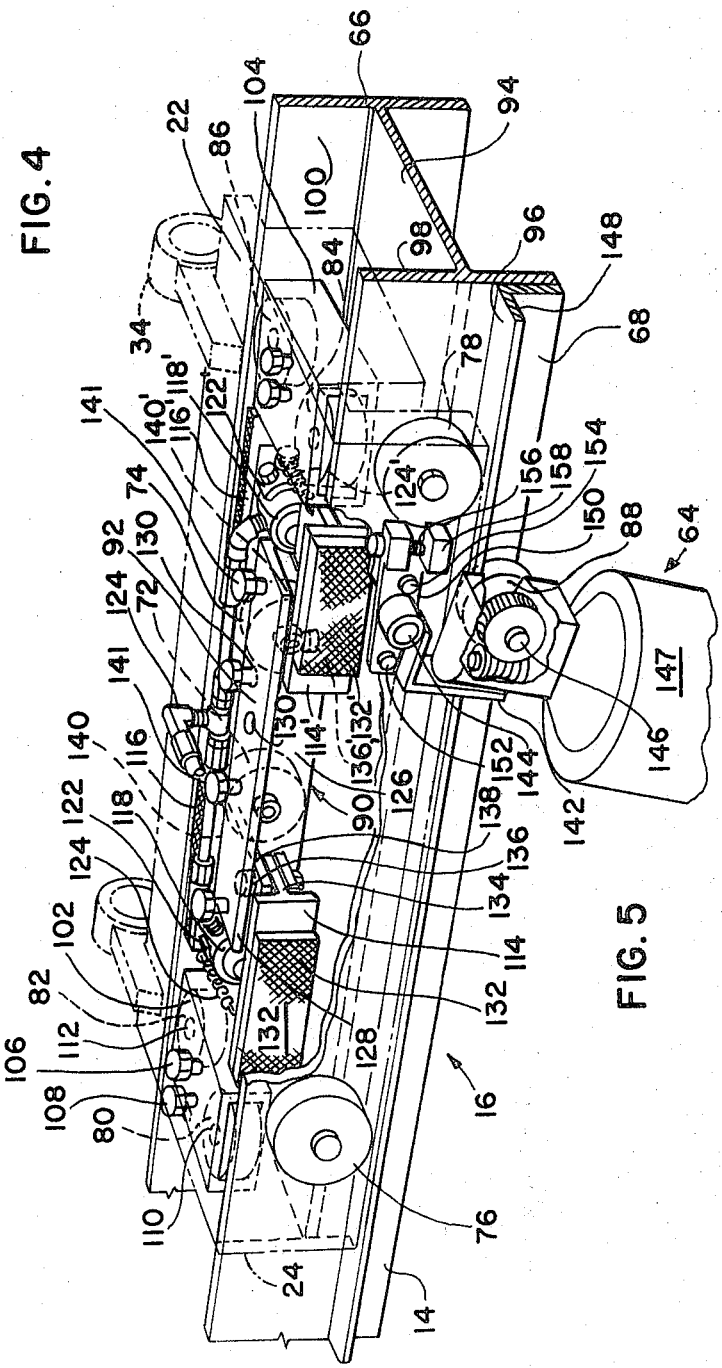

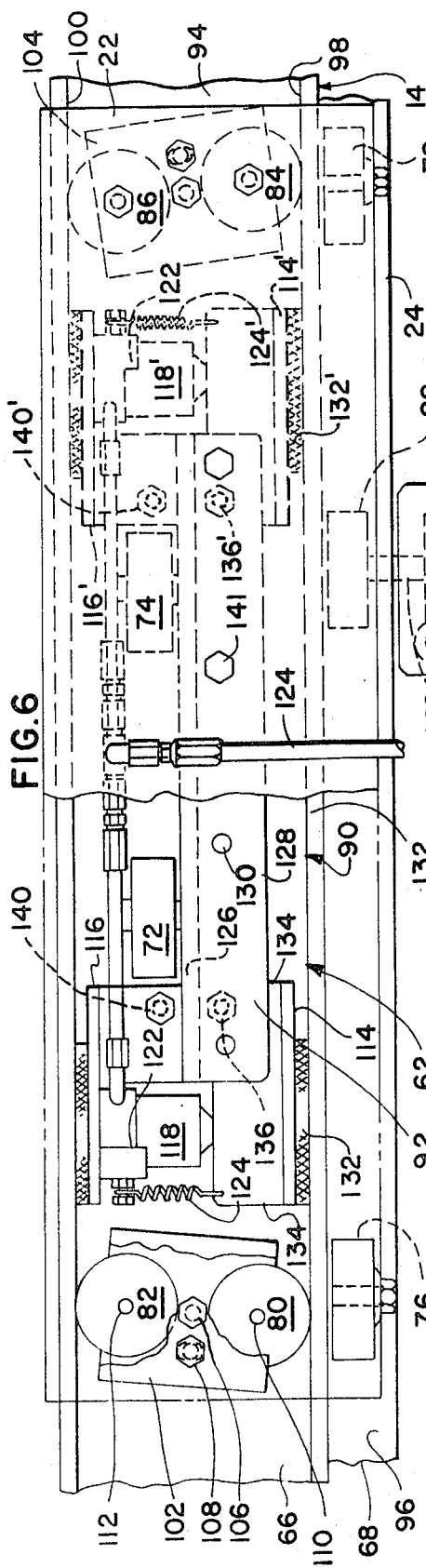
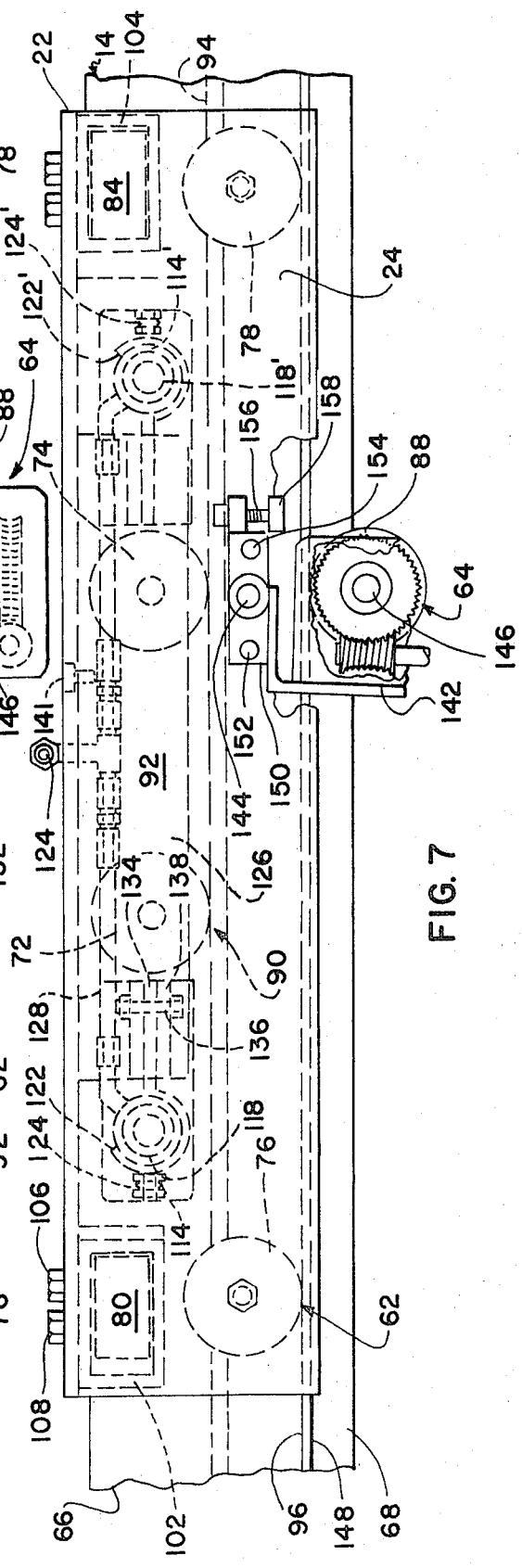
FIG.6
FIG.7

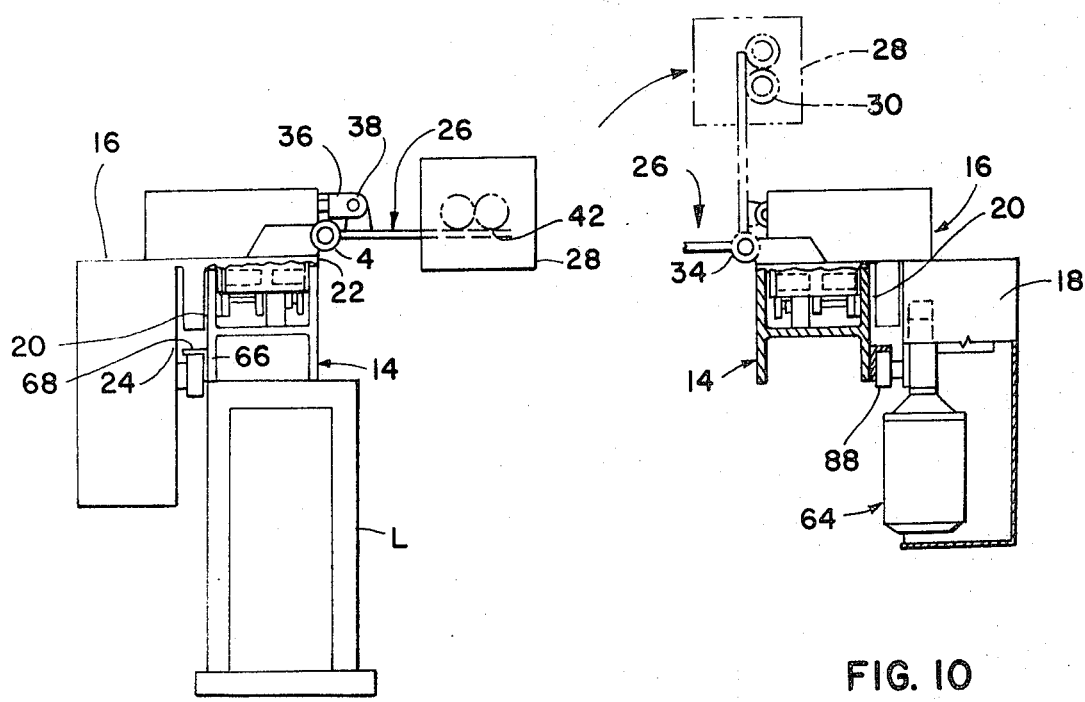
FIG. 9
FIG. 10
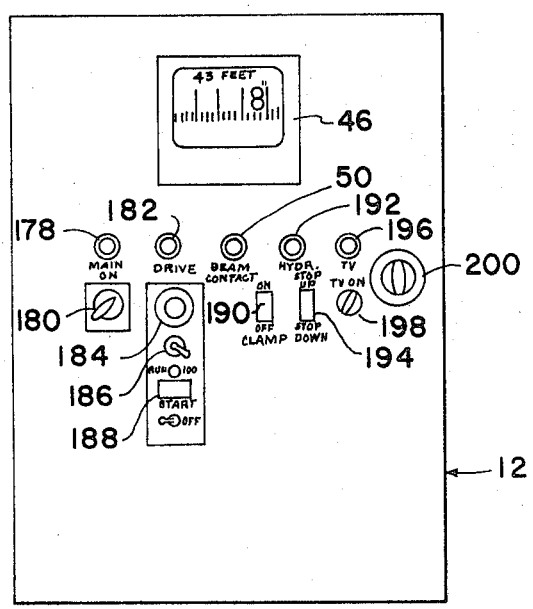
FIG. 11

LENGTH MEASURER FOR ELONGATE MATERIALS

This invention relates generally to measuring devices and specifically to stock length-setting apparatus for use with metal working machines of the type employed in cutting structural steel, pipe, building material and the like.

In the prior art, numerous stock-length setting devices with remote readouts have been disclosed. As manufactured, these devices typically comprise a horizontal way system, a carriage movable on the way either by self-propulsion or through a power transmission arrangement such as a chain drive, a face on or attached to the carriage perpendicular to the way system to contact the ends of pieces of stock to be measured, and means for indicating the longitudinal position of the carriage relative to the way system. Stock laid parallel to the way system with one end in contact with the carriage face thus extends a known distance past a predetermined fiducial point such as the plane of a cutoff saw, and many errors and repititious movements of manual methods of measurement are avoided, particularly if the system is powered as in the present invention.

Some devices of the type described have an inverse arrangement with the saw on the moving carriage and the stock end-stop at a fixed location.

In size, such devices range from the relatively primitive retracting flexible measuring tape with the case fixed to a table and the free end having a hook for engaging the end of stock moved along the table, to great combined installations capable of measuring and precisely cutting-to-length in continuous production the largest standard structural beams.

Prior to the present invention, the need for precision way and carriage structure has made heavy-duty automatic remote readout stock-length setting apparatus unduly expensive to purchase, difficult and expensive to ship and to assemble on site, and expensive to repair when damaged.

A principal object of the present invention is to provide a measuring device of the type described which is constructed of few and relatively simple components so that it can be produced at a reasonable cost, and which will measure accurately within the tolerance of a measuring tape.

Other objects are to provide a system as described which is substantially more damage resistant than prior-art devices, and which is easier and cheaper to repair and maintain.

Further objects are to provide a unit as described in which shipping risk is minimized, in which on-site assembly and adjustment are easily performed by semi-skilled labor, and in which way-length can be reduced or increased by any amount desired and at any time, using only semi-skilled labor.

Still other objects are to provide a system as described which is adaptable for use in almost every installation requiring measurement of structural-shape beams and the like, and which is equally adaptable for production in very small or very large size embodiments without change in design.

Yet further objects are to provide a system as described which is safe, flexible, substantially foolproof, and durable in operation, and which is pleasing in appearance.

In brief summary given for purposes of cursive description only, aspects of the invention include a carriage having a resilient anti-friction system adapting it for installation on a relatively rough or mill finish standard-section beam, a brake system bearing on the beam, a resilient drive, and a remote optical readout; a work-contact assurance circuit and a work-ejector system are also provided.

The above and other objects and advantages of the invention will become more apparent on inspection of the following description, including the drawings in which, like reference numeral denoting like parts:

FIG. 4 is a side elevation of a portion of the invention being assembled;

FIG. 5 is an isometric detail of a portion of the invention;

FIGS. 6 and 7 are respectively plan and elevation details showing assembly relations of parts detailed in FIG. 5;

FIG. 9 is an end elevation with a portion of the structure removed, taken at 9—9, FIG. 3;

FIG. 10 is a section taken at 10—10, FIG. 3;

FIG. 11 is a front elevation view of the control and readout console generally indicated in FIGS. 1 and 2.

Figure 1:
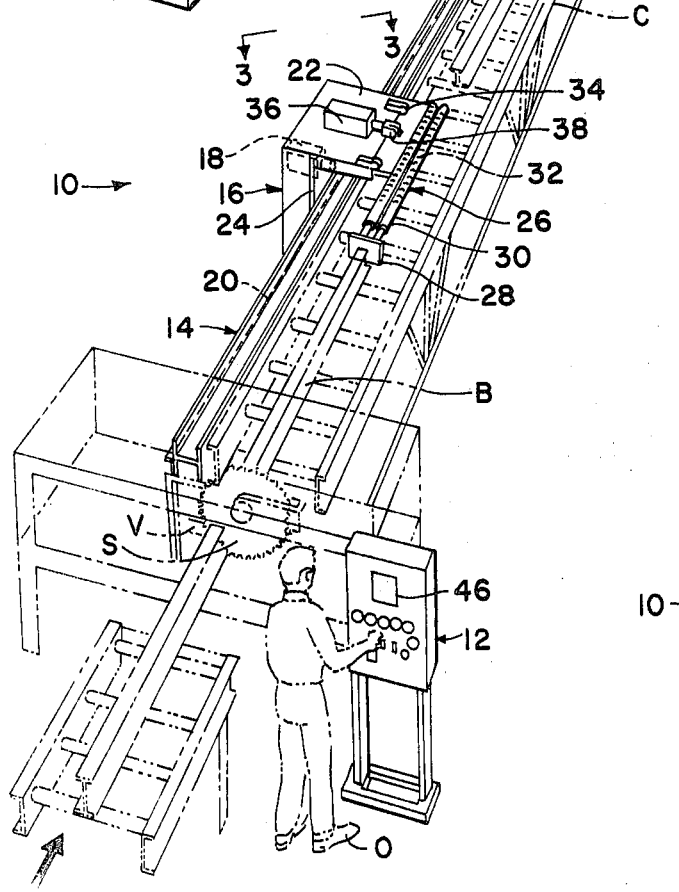
FIG. 1 is an isometric view of the invention installed for operation with a cutoff saw and conveyor which the Figure shows diagrammatically.
Figure 2:
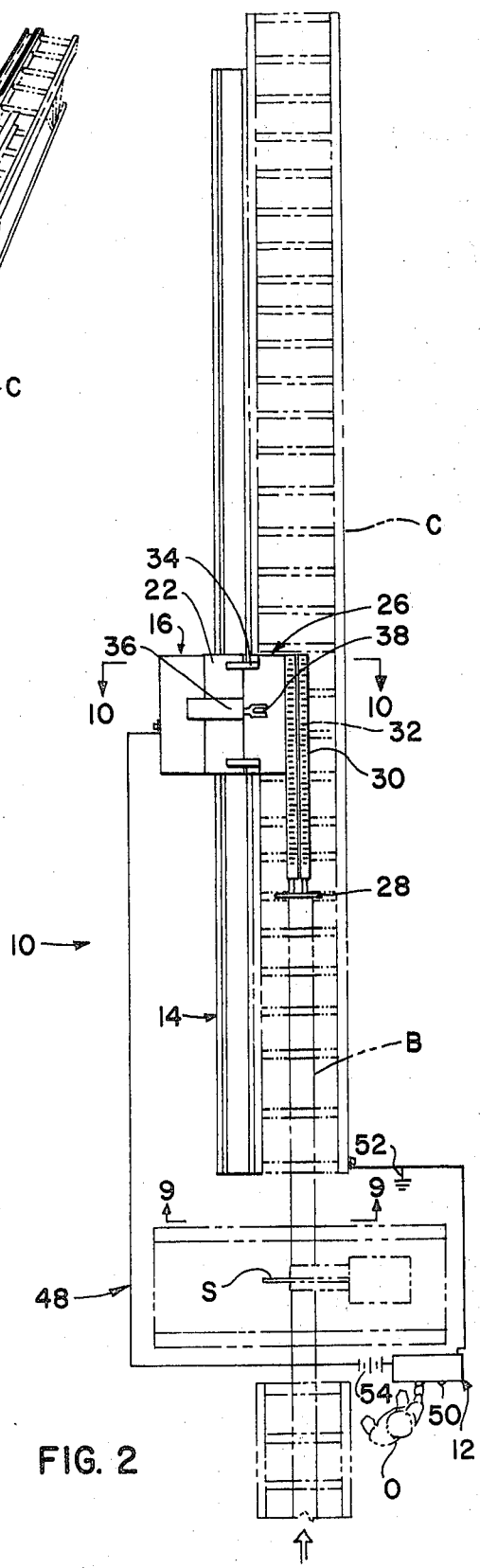
FIG. 2 is a plan view of the FIG. 1 installation.

FIGS. 1 and 2 show the invention 10 in use with cutoff saw S and conveyor C. The invention 10 comprises three principal components: a control and readout console 12, a linear way 14, and a self-propelled carriage 16 mounted for longitudinal travel along the way. Important aspects of the invention include the sectional shape of the way, note H-section shown in FIG. 1, and the mounting of the carriage 16 on it; these aspects are discussed later in reference to FIG. 3 and succeeding Figures, following a brief introductory discussion of FIGS. 1 and 2.

Position of the carriage 16 with respect to the length of the way 14 is indicated by a television camera 18 fixedly mounted inside the carriage and focussed on a graduated tape 20 fixed longitudinally to the side of way 14.

The carriage is in the shape of an inverted "L" comprising a simple 90° angle with a leg 22 horizontally disposed above the way and the other leg 24 disposed vertically downward alongside the way.

The carriage has a retractable lateral extension or swingout arm 26 with a limit plate 28 which serves as a stop and measuring point or reference face for stock pushed against it in preparation for stock length measurement. A shock absorber unit positions the limit plate 28 in a vertical plane perpendicular to the way 14 and the conveyor C which is parallel with the way. The shock absorber unit representatively consists of one or more piston and cylinder units 30 having resilient returns such as springs 32. The swingout arm connects with the carriage 16 by hinges 34 and by a hydraulic actuator 36 mounted on the carriage and connected with the arm at a hinge 38 to pivot the arm upward for stock passage or to extend it horizontally for measurement.

In operation, (which in general mode typifies that also of some prior-art devices) the operator O, by means of controlling carriage motion and reading carriage position at the console, runs the carriage 16 along the way 14 to a point which establishes the desired distance between the face of the laterally extended limit plate 28 and the cutting station represented by the far face of saw blade S, and then locks the carriage at that position. A length of stock such as the structural steel beam B, shown in phantom, is then advanced under the saw by a conventional beam actuation system (not shown) until the end contacts the limit plate 28. The operator then fixes the work by operatively closing the jaws of a vise V on it, runs the saw through the work, and finally releases the vise and retracts arm 26 and the saw, allowing the cut length of stock to be conveyed away by any suitable means. The operator repeats the sequence as required, changing the length setting as often as necessary.

The variable speed carriage drive, which is preferably a direct current electric drive, is arranged for smooth transition to zero velocity according to well established practice in the art, and permits the operator to slow and position the carriage as precisely as desired, referring for the purpose to the television monitor screen 46 (FIG. 1) before him on the console 12.

Using a standard closed-circuit television system such as the readily available Panasonic Model WV-200P/CCTV, or equivalent, with a conventional 5 power magnification at readout, as currently available from most dealers, the operator can easily and comfortably read position on the tape scale as well as he could do so at the carriage with the naked eye, namely, to within ten to twenty thousandths of an inch. With a precision tape, reasonably well mounted, an operator can routinely and speedily place the carriage within 1/32 inch at distances as great as 60 feet.

As will be seen later, because of special reproduceable-positioning advantages of the invention, placement of the television camera portion of the carriage to this accuracy also means placement of the limit plate to comparable accuracy.

FIG. 2 illustrates in plan view the general configuration of the FIG. 1 installation, and additionally shows a schematic diagram of the contact assurance circuit 48 of the invention.

As will be seen, the carriage mounting and drive electrically isolate the carriage 16 from the way 14. Advantage is taken of this feature to provide a rugged and nearly foolproof contact assurance circuit which gives a signal to the operator at the console when a steel beam or other conductive stock, is in contact with the limit plate 28.

The limit plate serves as one-half of a massive electrical switch or contactor and the beam the other half, completing a low potential circuit through the frame of the carriage and a lamp 50 on the console 12 which lights when contact is made between the plate and the beam. The conveyor is arranged to complete the circuit, as by having common grounding attachment 52 with the console.

The battery 54 indicated is schematic, any suitable source of potential may be used at any location in the console or the carriage. In actual practice, the electrical connection between console and carriage is preferably part of a flexible cable long enough to reach the end of the way. The flexible cable includes conventional power lines, television lines and control lines. In the simplest arrangement the cable may be overlaid on itself in a long trough-shaped box beneath the way to permit carriage travel, or may be arranged to pay out from a reel or the like.

However, the preferred cable arrangement is the conventional "C" section channel-and-hanger suspension used with accordian-loops of the cable as shown in the next Figure.

Figure 3:
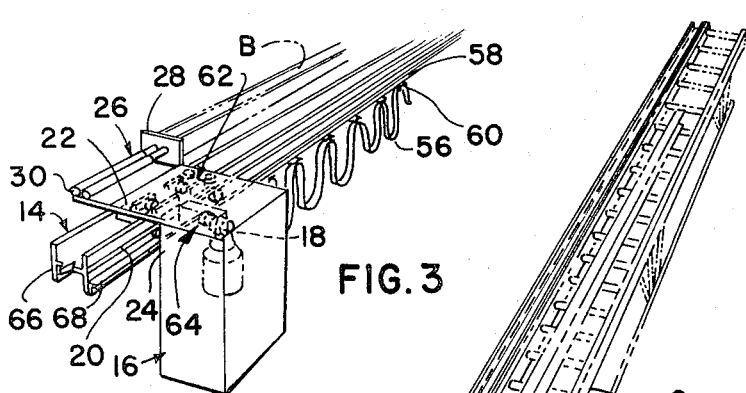
FIG. 3 is an isometric diagrammatical detail as viewed at 3—3, FIG. 1.

FIG. 3, taken at 3—3, FIG. 1, shows the cable 56 suspended from channel 58 by sliding hangers 60 as indicated. More importantly, FIG. 3 diagrams the arrangement of the way, the way-contacting rollers of the supporting and guiding system 62, and the carriage drive system 64.

Through special carriage supporting, drive, and braking and clamping features, which are described in detail in reference to later Figures, the invention permits use of a way in the form of a plain, unmachined structural steel member 66, with a smaller, similarly unmachined member 68 fixed to it, as a precision way system for all traveling, guidance, and clamping co-action with the carriage 16. No extra guide rails, guide ways, or guide rods are needed.

As shown, the way comprises an H-section beam 66 with a surface finish typical of or substantially equating to a mill-run hot-rolled steel surface finish, with web-connected parallel-opposed flanges vertical and with one leg of a relatively light-weight angle 68 tack-welded to the outside lower edge of one flange, leaving the other leg of the angle protruding outwardly.

The carriage support and guidance system 62 and drive system 64 contact the relatively rough way-surfaces with resilient rollers of nylon, rubber, or other elastomeric material, permitting use of the crude or rough-finish way as a precision way by averaging out the surface irregularities. The arrangement in turn leads to further substantial economic advantages.

FIG. 4 illustrates one of the further economic advantages. At the factory the carriage is completely assembled and fitted to a short length 70 of the crude way. The carriage and short length of way are then shipped as a compactly boxed unit to the place of use. The user in the meantime (or at any time) locally procures from any steel supply warehouse and welds together a suitable length or lengths of reasonably straight standard-section beam material into a simple way 14 having conventional legs L and cements a length of ordinary graduated tape 20, such as machinist's tape, along the side of it. To assemble the carriage to his locally made way 14, the user merely abuts the short or shipping length of way 70 to his way, using such props P as are convenient, and pushes or runs the carriage 16 onto his way.

The short or shipping length of way material can be economically discarded after shipping.

This procedure avoids the costs and risks or shipping long lengths (60 feet is not unusual) of expensive machined-or precision-ground ways, and the delays and expense of on-site assembly. The procedure substitutes instead the flexibility and economy of local procurement and in-place way fabrication using semi-skilled employees. Further, at any time and the same employees can weld-on additional material to lengthen the way, can shorten it by cutting as required, or can move the entire system to another plant using a short length of way and the carriage run-off, run-on technique described.

If changeover, to a different system of measurement is needed at any time, as in shifting from feet and inches to a decimal system, the tape can easily be removed and another substituted in a few minutes, since the carriage affords ample tape-clearance for the purpose.

FIGS. 5, 6 and 7 detail: (1) The novel relation of the plain, unmachined, or mill-rolled-finish H-beam 66 and structural angle 68 tack welded to it, comprising the way 14, and the eight widely spaced resilient rollers or wheels 72, 74, 76, 78, 80, 82, 84, 86, which guide and support the carriage, and the resilient roller or wheel 88 of the drive system of the invention; (2) the novel braking and clamping system 90 of the invention; and (3) the novel drive system 64 of the invention.

The support system includes a bogie 92 attached by bolts 141 to the under surface of the horizontal leg 22 of the carriage and having first and second wheels 72, 74, on parallel-spaced horizontal axles attached intermediate the length of the bogie, adapting the wheels for tandem travel along the web 94 of the H-beam. A second pair of wheels 76, 78, is similarly attached to the vertical leg 24 of the carriage outside the H-beam in position for tandem travel along the top surface 96 of the horizontally extended leg of the structural angle 68.

Two pairs of resilient wheels or guide rollers 80, 82 and 84, 86, rolling on the opposed inner surfaces 98, 100, of the upper portions of the vertical flanges of the H-beam supply lateral guidance for the carriage.

Each pair of guide rollers is opposedly mounted at one end of the carriage on a box-shaped bracket 102, 104 adjustably attached by a pivot 106 and bolt-in-slot 108 to the underside of the horizontal arm 22 of the carriage. The center-to-center distance of the paired axles 110, 112, on the brackets is made slightly too great to permit the wheels to travel side by side in lateral opposition along the opposed flanges, so that the box-shaped brackets are slightly tipped off the longitudinal centerline when the wheels are in contact. The open-end box shape of the brackets supports each end of the wheel axles and increases resistance to flexing.

This arrangement provides great mechanical advantage in tightening the lateral guidance system; by pivoting the box-shaped brackets the two pairs of guide wheels can easily be wedged between the H-beam flanges to any degree necessary to eliminate backlash and tightened in that position.

The novel braking and clamping system of the invention includes structure pivoted to and extending beyond each end of the bogie in the form of a pair of pivotally mounted laterally opposed brakeshoes 114, 116, 114', 116' arranged facing outward to bear on the opposed inner surfaces 98, 100 of the H-beam flanges when thrust outward at the respective ends by transversely disposed hydraulic piston assembly actuators 118, 118' activated through common line 124. A bracket 122, 122' welded in place, secures one end of each piston assembly to a shoe 116, 116'; the free ends of the piston assemblies bear on the inner surfaces of each of the other shoes 114, 114'. A tension spring 124, 124' connecting the extended ends of the brakeshoes, retracts them when the brakes are not activated.

The body of the bogie comprises a longitudinally arranged structural angle (FIGS. 5 and 6) with a first leg 126, the wheel attachment leg, vertical; the other or second leg 128 is horizontal and has a series of holes 130 along the leg for bolting or other attachment to the horizontal leg of the carriage. Each brakeshoe has an asbestos-composition or other standard facing 132, 132' conventionally cemented in place over the terminally extending two-thirds of the shoe. The shoe 114 preferably is a piece of T-section angle with a length of the shank forming a lug 134 at one end, holed to receive a pivot 136. A corresponding lug 138 is welded to the side of the vertical leg 126 of the bogie. Brakeshoes 116, 116' and the mountings are similar to the foregoing except that a portion of the shank of the "T" section is removed to provide flat bearing contact with the actuators and the bracket 122 is welded to it. The brakeshoe pivots 136, 136', 140, 140', are located at the same paired longitudinal positions at each end of the bogie.

The braking arrangement thus provides four significant advantages: (1) actuation pressure on one shoe tends to be symmetrically compensated by that on the other shoe, minimizing twisting of the carriage relative to the longitudinal axis of the way, and (2) braking forces apply directly to the ultimate structure, permitting the use of relatively long brakeshoes without undue stress or flexure; (3) the limited range of brakeshoe freedom makes the unit resistant to rotation about the long axis; this feature together with the engagement of flange 68 between the carriage drive wheel and support wheels, and the close fit of the pairs of guidance wheels, holds the carriage to the way so securely that it cannot be tipped or rotated up and out of the way. This simplifies the design of the way by removing any need to provide retaining angles along the tops of the flanges of the H-section; (4) last but not least, the relatively great offset of the pivots and brakeshoes on the bogie which extends a major portion of the length of the carriage, and the simplicity, with complete absence of precision parts of the nature of scissors clamps or locking lever clamps, provide maximum longitudinal stability and reliability at minimum cost.

By the above provisions, displacement of the limit plate when contacted by a beam is strongly resisted so that the limit plate can be positioned further to the side than would otherwise be possible, and used with heavier-section beams.

The novel proportional-force carriage drive of the invention further contributes to the silent, longwearing, shockproof, error-averaging characteristics of the system, while at the same time affording almost irreducible economy in construction assembly, adjustment, and space required, as will be apparent in the following provisions, still referring to FIGS. 5 – 7.

The measuring device is equipped with a variable speed drive which enables the carriage to travel at high speeds for the longer distances and at slow-approach speeds for precise positioning. The drive system 64 is mounted vertically on the carriage in the manner of a pendulum, on a bracket 142 pivotally suspended from a pivot stud 144 adjustably clamped to the vertical leg 24 of the carriage above the structural angle 68 of the way (FIGS. 5 and 7; a portion of the overlying drive structure is omitted in FIG. 6). The resilient drive wheel 88 extends on a right-angle driveshaft 146 from the drivemotor 147 beneath the structural angle 68 and rolls along the under surface 148 (FIGS. 5 and 7) of the horizontal leg or horizontal flange. The pivot is thus located beyond the drive surface from the roller. The pivot stud 144 adjustment comprises a plate 150 mounted perpendicular to it and having holes for two securing bolts 152, 154, and a tangent jackscrew 156 threaded through one end and bearing on a boss 158 extendig from the carriage (FIGS. 5 and 7). Initial adjustment is made with the drivemotor hanging in a completely vertical direction, by raising the pivot stud 144 until the drivewheel lightly contacts the way, using the jackscrew 156 on the end of the pivot stud mounting plate 150, and then tightening the plate against the carriage. When the drivewheel is driven in either direction it forces the drivemotor to swing up in the direction driven, thus increasing the contact pressure between the drivewheel and the structural angle and assuring positive traction at all times. The self-adjusting increase in contact pressure in proportion to the resistance encountered permits the use of a rough, imprecise drive surface, prevents drivewheel slippage under varying loads, resists shock, provides smooth acceleration without overconstraint, and makes adjustment very easy as noted. Further, in the stopped position the drivemotor rests in the vertical position with the least amount of friction between drivewheel and angle, permitting easy roll-on assembly as described, and preventing "set" distortion of the drivewheel when at rest. The control system includes an interlock which operates the brake system when the drivemotor de-energizes, and vice-versa. Thus the combination of interlock with the drive arrangement additionally protects the motor from shock loads under material impact, prevents the braking and clamping system and the drive from working against each other, permits only the braking-clamping system to define the position of the carriage when set for measuring, increasing the reproduceability of measurements made.

The variable speed drivemotor may be electrically or hydraulically driven, and may be of the differential/band type, the split, variable-spacing pulley and cone type, or any other conventional type which adjusts smoothly from zero rotational velocity to design maximum in either direction.

Figure 8:
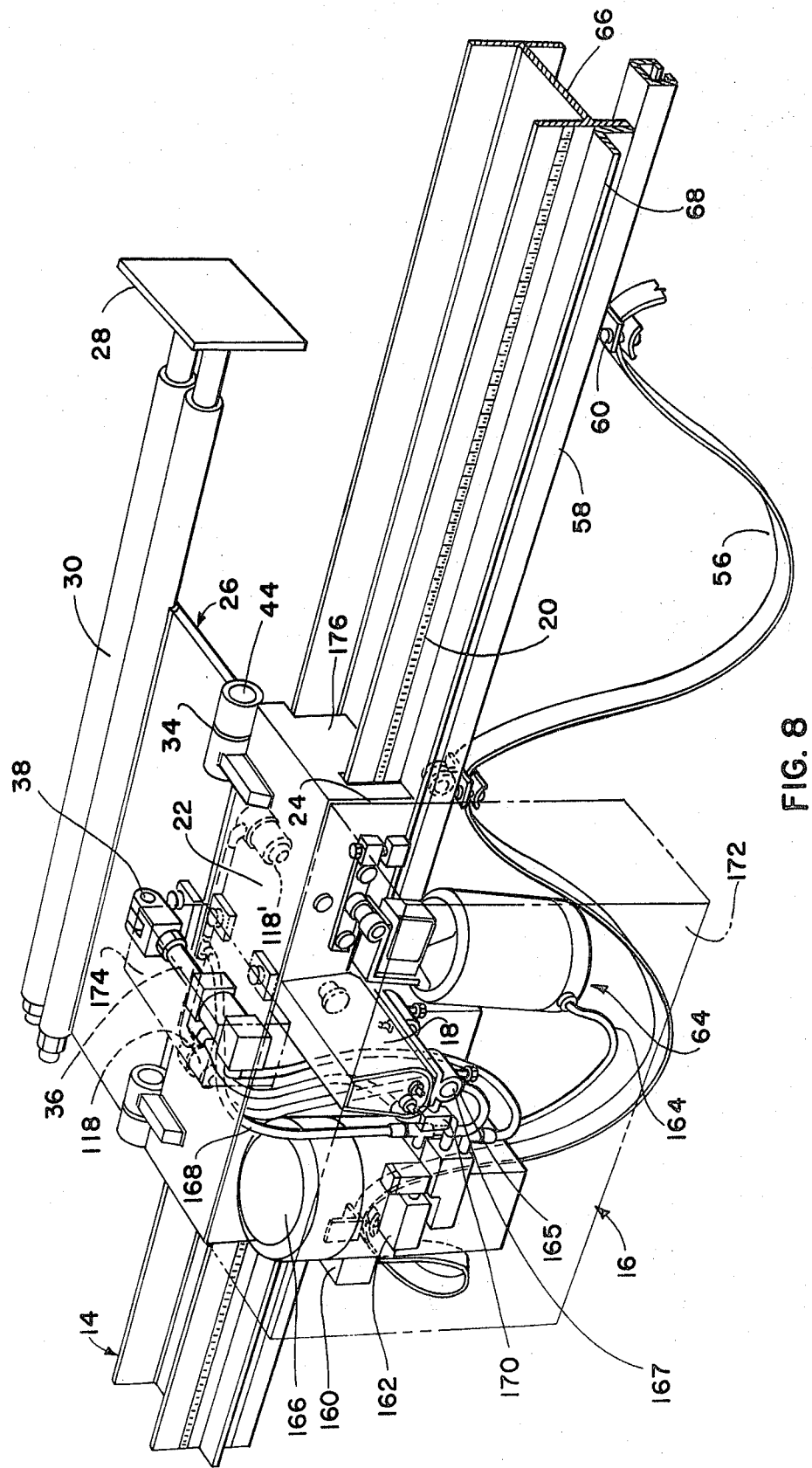
FIG. 8 is an isometric view of further components of the detail shown in FIG. 5.

FIG. 8 is an isometric detail indicating the actualaccessory locations and the as-manufactured appearance of the carriage 16. Electrical junction boxes 160, 162 receive the leads from accordian-suspension flat cable 56. Feeder lines as at 164, leading from the junction boxes, provide the various power, control and sensory connections for the accessories, which include the drive system 64, hydraulic pump 166, the previously described contact assurance circuit, and television camera 18. A clamp 165 and rod 167 arrangement adjustably secures the camera in place for viewing through an appropriate aperture in the carriage. Hydraulic lines 168 conventionally controlled by well known circuits through solenoid valves as at 170, connect with the double-action swingout arm actuator 36 and the brake actuators, as at 118, 118'.

Metal covers 172, 174, and end shields 176 which are contoured for close clearance with the ways enclose and protect the carriage accessories in a compact overall configuration.

FIGS. 9 and 10 respectively and end view and a section taken at 9—9 and 10—10, FIG. 2, further indicate the relations of the parts described and the two operating positions of the swing out-arm 26 by the reference lines in the latter Figure.

FIG. 11 shows the convenient arrangement of the control panel with the television screen 46 at the top, and below it from left to right, the main on-off indicator light 178 and switch 180 the carriage drive on-off light 182 and below that the carriage drive speed dial 184, the carriage drive forward/off/reverse switch 186, the carriage drive start-stop switch 188 the beam contact light 50 of the contact assurance circuit, the carriage clamp or brake switch 190, marked "clamp-on," "clamp-off," the hydraulic system operation light 192; the stop-up/stop-down switch 194 for positioning the swing-out arm in those two positions, and the T-V on light 196 and T-V on-off switch 198. The hinged console door opened by latch 200 makes the interior wiring readily accessible for inspection.

Figure 12:
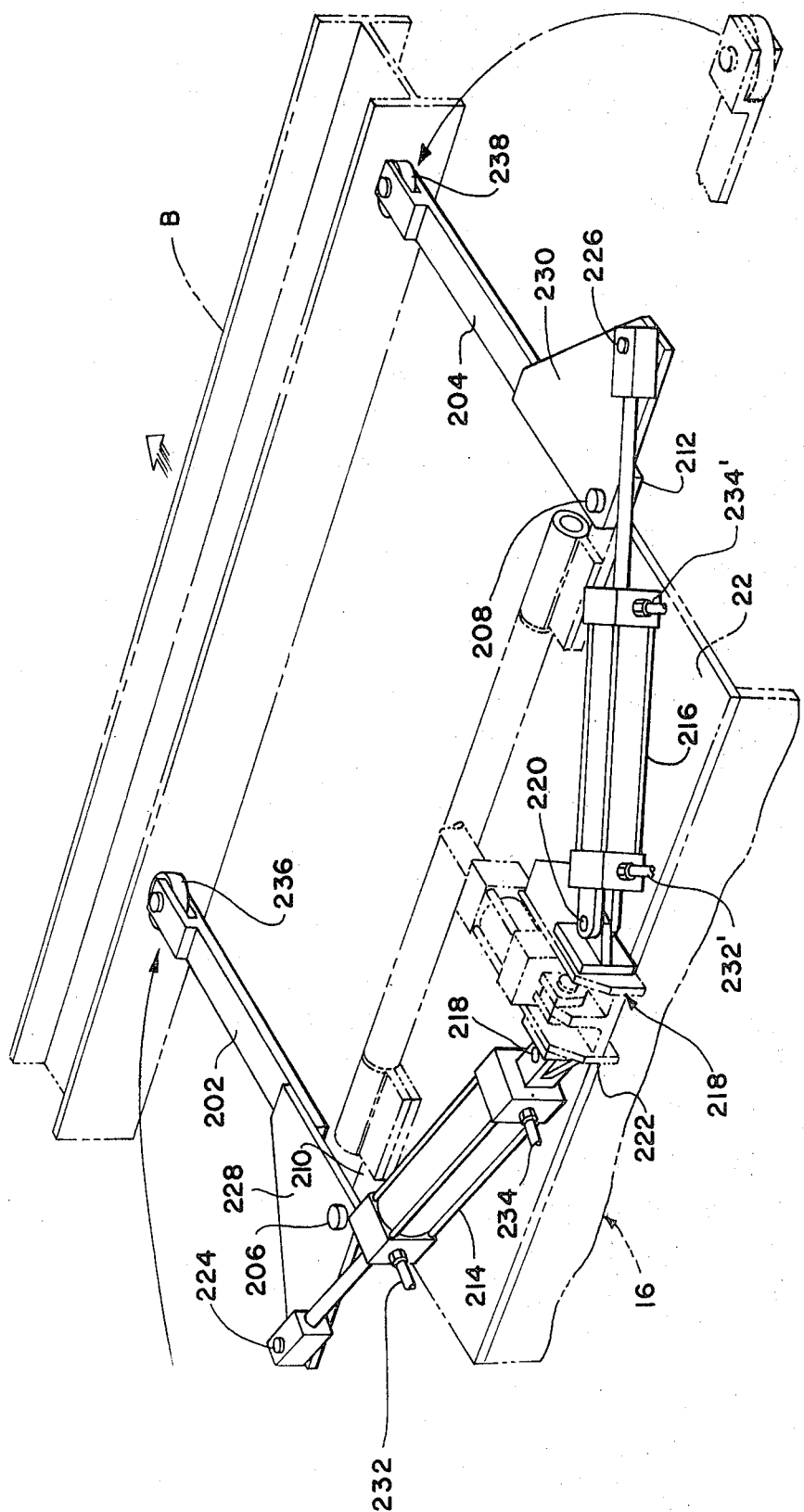
FIG. 12 is an isometric view of a work-ejector system.

FIG. 12 illustrates an optional feature of the invention, a pair of ejector arms 202 and 204 which laterally thrust away work such as beam B from the vicinity of the carriage 16 after measurement. Each ejector arm pivots parallel to the top of the carriage about a vertical bolt 206, 208, attached to a respective longitudinal outboard protrusion 210, 212 of the horizontal leg 22 of the carriage, avoiding mounting interference with the swing-out arm. Respective double-acting hydraulic actuators 214, 216 extend and retract the ejector arms, themselves pivoting at one end on bolts 218, 220 at a bracket assembly 222, which preferably pivotally mounts one end of the swing-out arm previously described, and at the other end pivoting on bolts 224, 226, mounted to bellcrank flanges 228, 230 fixed to the respective ejector arms.

A common hydraulic feed represented by lines 232, 234, 232', 234', under conventional control not shown, synchronizes operation of the ejector arms with operation of the swing-out arm 26 detailed in previous Figures. Anti-friction rollers 236, 238 on the respective ends of the ejector arms reduce wear, noise, friction and error in thrusting the work aside. Retracted, the ejector arms extend parallel with the long dimension of the carriage, and extended, swing to a transverse position symmetrical about the transverse centerline of the carriage as indicated by the phantom fragmentary detail and arrows. The synchronous symmetrical operation of the arms tends to balance the thrusting forces, preventing beams from skewing when thrust laterally off an adjacent conveyor.

Obviously many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. In an elongate-material lengthmeasuring machine having a way, a carriage, a measuring reference on the carriage, means for mounting the carriage movably along the way, means for moving the carriage along the way, means for guiding movement of the carriage along the way, means for fixing the position of the carriage on the way, and means for indicating the position of the carriage along the way, the improvement comprising: the way having a horizontally extending flange and a pair of vertical parallel-opposed flanges with a horizontal web connecting the parallel-opposed flanges, the means for moving the carriage along the way including a pivot on the carriage above the horizontally extending flange, a bracket suspended from the pivot, driving means affixed to the bracket, the driving means having an output shaft with a resilient drivewheel, the drivewheel periphery in contact with the underside of the horizontally extending flange, whereby rotation of the drivewheel in either direction tightens said contact with the underside of the horizontally extending flange, the means for guiding the carriage including a plurality of resilient guide rollers respectively contacting said parallel-opposed flanges, the means for movably mounting the carriage including a plurality of resilient support rollers respectively contacting portions of the way, and the means for fixing the carriage position comprising a plurality of friction members opposedly contacting said parallel opposed flanges.

2. In an elongate-material length-measuring machine having a way, a carriage, means for mounting the carriage movably along the way, means for moving the carriage along the way, means for fixing the position of the carriage on the way, structure comprising a reference surface for measuring with respect to the carriage, and means for indicating the position of the carriage along the way, the improvement comprising: the way including a beam having flanges forming a channel section, said beam having a surface finish substantially equating to a mill-run hot-rolled-steel surface-finish, the means for mounting the carriage movably along the way including a plurality of resilient rollers contacting plural surfaces of the channelsection beam between said flanges thereof; the means for moving the carriage along the way comprising a resilient roller, and the means for indicating the position of the carriage along the way comprising a plurality of numbered graduations along the way and a television system including a television camera on the carriage having connection with a television readout for observing said plurality of graduations on the way at a remote location.

3. In an elongate-material length-measuring machine as recited in claim 1, the carriage having a horizontal member over the way and a vertical member extending downward from the horizontal member proximate the horizontal flange of the way, and said plurality of resilient support rollers including at least one resilient support roller contacting said web and one resilient support roller contacting the upper side of said horizontal flange.

4. In an elongate-material length-measuring machine as recited in claim 3, the means for fixing the position of the carriage being located between the parallel opposed flanges of the way, means attaching said at least one resilient support roller contacting the web to the means for fixing the position of the carriage, and means attaching the means for fixing the position of the carriage to said horizontal member of the carriage.

5. In an elongate-material length-measuring machine as recited in claim 4, the means for fixing the position of the carriage comprising a bogie, a pair of outward facing brakeshoes at each end of the bogie, means for movably mounting all said brakeshoes to the bogie, and means for forcing apart the brakeshoes of each said pair of brakeshoes, thereby fixing the carriage in position by friction between the brakeshoes and said parallel opposed flanges of the way.

6. In an elongate-material length-measuring machine as recited in claim 5, the means for movably mounting all said brakeshoes to the bogie comprising pivot structure, and the means for forcing apart the brakeshoes comprising an extensible member positioned between and in contact with the respective brakeshoes of each said pair of brakeshoes.

7. In an elongate-material length-measuring machine as recited in claim 5, the plurality of resilient guide rollers comprising: a bracket at each end of the carriage, means pivotally mounting each bracket to the underside of the horizontal member of the carriage, means for adjustably constraining pivotal motion of all said brackets, and a pair of said resilient guide rollers rotatable mounted to each of said brackets with the resilient guide rollers thereof in contact respectively with the respective parallel-spaced flanges.

8. In an elongate-material length-measuring machine as recited in claim 7, the spacing of said resilient guide rollers in each pair being too great to permit the resilient guide rollers to travel side-by-side in lateral opposition between said parallel-opposed flanges.

9. In an elongate-material length-measuring machine as recited in claim 8, each said bracket being in the shape of an open-end box and containing a respective said pair of rollers therein.

10. In an elongate-material length-measuring machine as recited in claim 1, the means for indicating the position of the carriage along the way comprising a plurality of numbered graduations along the way, and a television system including a television camera on the carriage having connection with a television readout remote from the carriage for observing said plurality of graduations on the way.

11. In an elongate-material length-measuring machine as recited in claim 10, said plurality of graduations being on an elongate strip, with the elongate strip affixed to said way.

12. In an elongate-material length-measuring machine as recited in claim 1, the measuring reference on the carriage comprising a plate having a reference face thereon, means for pivotally extending the plate to the side of the carriage, and means for retracting the plate when extended to the side of the carriage.

13. In an elongate-material length-measuring machine as recited in claim 12, electric circuit structure flexibly extending from a location remote from the carriage and connecting through the frame of the carriage and said plate, for thereby indicating contact of a beam with said plate.

14. In an elongate-material length-measuring machine as recited in claim 1, wherein additionally is provided a work-thrusting system comprising a pair of ejector arms, means for pivotally securing the pair of ejector arms to the carriage, and means for synchronously pivoting said pair of ejector arms.

15. In an elongate-material length-measuring machine as recited in claim 14, wherein the means for pivotally securing the pair of ejector arms includes an outboard protrusion at each end of the carriage and pivot structure on each said outboard protrusion.

16. In an elongate-material length-measuring machine having a way, a carriage, means for mounting the carriage movably along the way means for moving the carriage along the way, means for fixing the position of the carriage on the way, means for forming a reference position for measurement lateral to the carriage, and means for indicating the position of the carriage on the way, the improvement comprising: a swing-out arm, means for extending and retracting the swing-out arm transverse to the direction of the way; a work thrusting mechanism comprising an ejector arm at each end of the carriage, means for pivotally mounting each said ejector arm outboard each respective end of the carriage, and means for pivoting said ejector arms in synchronism to a position extending transversely from said carriage.

* * * * *